United States Patent
Lessing et al.

(10) Patent No.: US 7,535,484 B2
(45) Date of Patent: May 19, 2009

(54) COMMUNICATION TERMINALS THAT VARY A VIDEO STREAM BASED ON HOW IT IS DISPLAYED

(75) Inventors: Simon Lessing, Lund (SE); Emil Hansson, Malmo (SE)

(73) Assignee: Sony Ericsson Mobile Communications AB (SE)

( * ) Notice: Subject to any disclaimer, the term of this patent is extended or adjusted under 35 U.S.C. 154(b) by 857 days.

(21) Appl. No.: 11/079,155

(22) Filed: Mar. 14, 2005

(65) Prior Publication Data

US 2006/0203080 A1     Sep. 14, 2006

(51) Int. Cl.
*H04N 7/14* (2006.01)
(52) U.S. Cl. ............... 348/14.01; 348/14.05; 348/14.13
(58) Field of Classification Search ............... 348/14.02, 348/14.01, 14.05, 14.07, 14.12, 14.13
See application file for complete search history.

(56) References Cited

U.S. PATENT DOCUMENTS

| | | | |
|---|---|---|---|
| 5,821,986 A | 10/1998 | Yuan et al. | |
| 2001/0037508 A1 | 11/2001 | Hindus et al. | |
| 2002/0167586 A1 | 11/2002 | Liu | |
| 2003/0172131 A1 | 9/2003 | Ao | |
| 2003/0222973 A1* | 12/2003 | Hiroi et al. | ............... 348/14.01 |
| 2005/0094646 A1 | 5/2005 | Lee | |

FOREIGN PATENT DOCUMENTS

| | | | |
|---|---|---|---|
| EP | 1 033 848 A1 | 9/2000 |
| GB | 2 384 932 A | 8/2003 |

OTHER PUBLICATIONS

International Search Report and Written Opinion for PCT/EP2006/002107; Date of mailing Aug. 9, 2006.

* cited by examiner

*Primary Examiner*—Stella L Woo
(74) *Attorney, Agent, or Firm*—Myers Bigel Sibley & Sajovec, P.A.

(57) ABSTRACT

A communication terminal includes a communication module, a camera device, a display device, and a controller. The communication module receives a display characteristic command and an input video data stream from a remotely located other communication terminal and sends an output video data stream thereto. The camera device generates an initial video data stream based on incident light. The display device displays a received input video data stream from the remote communication terminal. The controller generates the output video data stream based on the initial video data stream and a received display characteristic command from the remote communication terminal.

16 Claims, 4 Drawing Sheets

COMMUNICATION TERMINALS THAT VARY A VIDEO STREAM BASED ON HOW IT IS DISPLAYED

FIELD OF THE INVENTION

The present invention generally relates to the field of communications, and more particularly to apparatus and methods for providing video telephony.

BACKGROUND OF THE INVENTION

Wireless communication terminals have evolved to include increasingly more functionality. For example, some wireless communication terminals provide video telephony by which users of two terminals can both see and hear one another. Video telephony capable terminals can include a camera and microphone that generates a respective video stream and audio stream, and which are communicated over a wireless interface to another one of the terminals.

Providing video telephony over a wireless interface can be difficult because of the amount of data bandwidth that can be needed to send and receive real time/near-real time video audio streams over wireless communication interfaces that can have significant bandwidth constraints. In some video telephony applications, wireless communication terminals need to both send and receive real time video streams, and which can include 10 frames per second. The resulting data bandwidth requirements on the wireless interface can exceed those needed for voice only calls by a multiple of about 5 to 10 times. Such high data bandwidth may not be readily available when the air interface is shared among many wireless communication terminals, such within a service area of a cellular base station in a cellular communication system. Accordingly, providing video telephony over an efficiently utilized wireless communication interface continues to be a challenge.

SUMMARY OF THE INVENTION

In some embodiments of the present invention, a communication terminal includes a communication module, a camera device, a display device, and a controller. The communication module receives a display characteristic command and an input video data stream from a remotely located other communication terminal and sends an output video data stream thereto. The camera device generates an initial video data stream based on incident light. The display device displays a received input video data stream from the remote communication terminal. The controller generates the output video data stream based on the initial video data stream and a received display characteristic command from the remote communication terminal.

In some further embodiments, the display characteristic command can be indicative of a resolution at which the output video data stream will be displayed on the remote communication terminal. The controller can vary a resolution of the output video data stream responsive to the indication by the received display characteristic command of the resolution at which the output video data stream will be displayed on the remote communication terminal.

In some further embodiments, the controller can compress the initial video data stream to generate the output video data stream using a compression rate that varies responsive to the indication by the received display characteristic command of the resolution at which the output video data stream will be displayed on the remote communication terminal. The controller can compress the initial video data stream to generate the output video data stream using a lossy data compression algorithm that provides a variable quality of video. The quality of video can be varied responsive to the indication by the received display characteristic command of the resolution at which the output video data stream will be displayed on the remote communication terminal.

In some further embodiments, the controller can vary a frame rate of the output video data stream responsive to the indication by the received display characteristic command of the resolution at which the output video data stream will be displayed on the remote communication terminal.

In some further embodiments, the received display characteristic command can be indicative of a frame rate at which the output video data stream will be displayed on the remote communication terminal. The controller can vary a frame rate of the output video data stream responsive to the indication by the received display characteristic command of the frame rate at which the output video data stream will be displayed on the remote communication terminal. The controller can vary a resolution of the output video data stream relative to the initial video data stream responsive to the indication by the received display characteristic command of the frame rate at which the output video data stream will be displayed on the remote communication terminal.

In some further embodiments, the received display characteristic command can be indicative of whether the output video data stream will be displayed on the remote communication terminal. The controller can selectively transmit or not transmit the output video data stream responsive to the indication by the received display characteristic command of whether the output video data stream will be displayed on the remote communication terminal.

In some further embodiments, the communication module can include a wireless communication module that is configured to receive the display characteristic command and the input video data stream over a wireless communication interface from the remote communication terminal, and configured to transmit the output video data stream thereto over the wireless communication interface. The controller can vary a maximum amount of data bandwidth of the wireless communication interface that is used to transmit the output video data stream to the remote communication terminal responsive to the received display characteristic command. The received display characteristic command is indicative of a resolution at which the output video data stream will be displayed on the remote communication terminal. The controller can vary a resolution of the output video data stream responsive to the indication by the received display characteristic command of the resolution at which the output video data stream will be displayed on the remote communication terminal.

In some further embodiments, the received display characteristic command is indicative of a frame rate at which the output video data stream will be displayed on the remote communication terminal. The controller can vary a frame rate of the output video data stream that is transmitted across the wireless interface responsive to the indication by the received display characteristic command of the frame rate at which the output video data stream will be displayed on the remote communication terminal.

In some further embodiments, the received display characteristic command is indicative of whether the output video data stream will be displayed on the remote communication terminal. The controller can selectively transmit or not transmit the output video data stream across the wireless interface responsive to the indication by the received display characteristic command of whether the output video data stream will be displayed on the remote communication terminal.

In some further embodiments, the communication module is configured to receive an input audio data stream from the remote communication terminal and to send an output audio data stream thereto. The terminal can also include a microphone that is configured to generate the output audio data stream responsive to incident sound, and a speaker that is configured to generate sound responsive to the input audio data stream.

In some other embodiments of the present invention, a communication terminal includes a communication module, a camera device, a display device, and a controller. The communication module receives an input video data stream from a remotely located other communication terminal and sends a display characteristic command and an output video data stream thereto. The camera device generates the output video data stream based on incident light. The display device displays a received input video data stream from the remote communication terminal according to a variable video resolution and/or a variable video frame rate. The controller is configured to control the display device to display the input video data stream with a particular one of the variable video resolutions and/or a particular one of the variable video frame rates, and to generate the display characteristic command so that it is indicative to the remote communication terminal of the particular video resolution and/or the particular video frame rate at which the input video data stream is displayed on the display.

In some further embodiments, the terminal further includes a user interface through which a user can generate a command to change a size of a portion of the display device that is used to display the input video data stream. The controller can vary the particular video resolution and/or the particular video frame rate at which the display device displays the input video data stream responsive to the indication from a user via the user interface, and can generate the display characteristic command so that it is indicative to the remote communication terminal of the particular video resolution and/or the particular video frame rate at which the input video data stream is displayed on the display.

In some further embodiments, the controller can command the remote communication terminal through the display characteristic command to compress the video data stream sent to the communication terminal using a compression rate that varies responsive to the indication by the display characteristic command of the particular video resolution and/or the particular video frame rate at which the input video data stream is displayed on the display.

In some further embodiments, the controller can command the remote communication terminal through the display characteristic command to compress the video data stream sent to the communication terminal using a lossy data compression algorithm that provides a variable quality of video which is varied responsive to the indication by the display characteristic command of the particular video resolution and/or the particular video frame rate at which the input video data stream is displayed on the display.

In some further embodiments, the controller can command the remote communication terminal through the display characteristic command to vary a video frame rate of the video data stream that is sent to the communication terminal as the input video data stream responsive to the indication by the display characteristic command of the particular resolution and/or the particular video frame rate at which the input video data stream is displayed on the display.

In some further embodiments, the controller can selectively display or not display the input video data stream on the display device responsive to a command from a user, and can command the remote communication terminal through the display characteristic command to stop sending the input video data stream when the controller does not display the input video data stream on the display device.

In some further embodiments, the communication module comprises a wireless communication module that is configured to receive the input video data stream from the remote communication terminal over a wireless communication interface and to transmit the display characteristic command over the wireless communication interface.

In some further embodiments, the controller can command the remote communication terminal through the display characteristic command to vary a maximum amount of data bandwidth of the wireless communication interface that it uses to transmit the video data stream to the communication module of the communication terminal.

DETAILED DESCRIPTION OF EMBODIMENTS OF THE INVENTION

Figure 1:
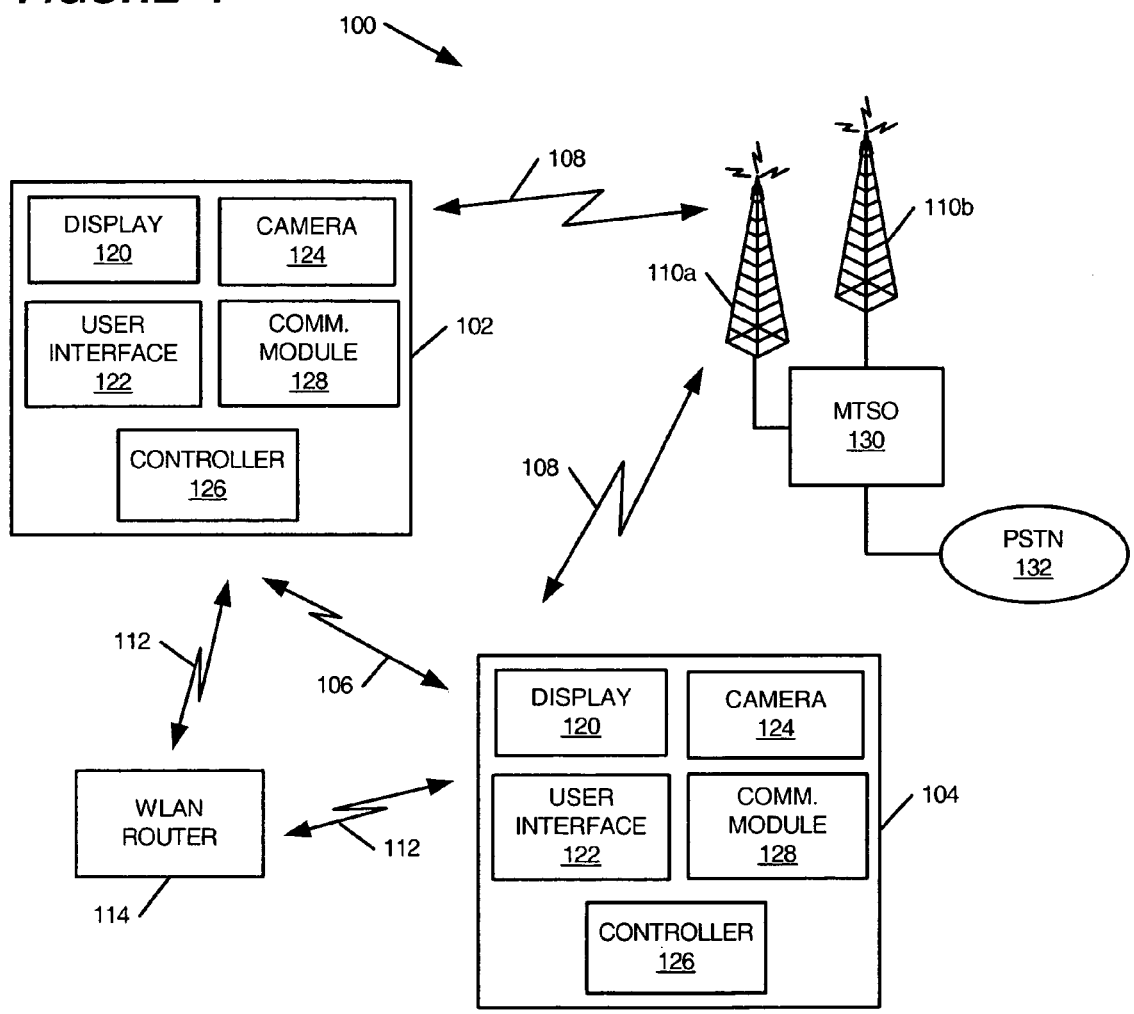
FIG. 1 is a schematic block diagram illustrating a wireless communication terminals and a cellular communication system that provide video telephony in accordance with some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a wireless local area network (WLAN), and/or another communication terminal. When the communication terminal is configured to communicate over a wireless interface, it is referred to herein as a "wireless communication terminal" and a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

FIG. 1 is a schematic block diagram of a wireless communication system 100 that includes two wireless terminals 102, 104 that are configured to communicate data with one another over a direct wireless communication interface 106 therebetween, over another wireless communication interface 108 through one or more cellular base stations 110a-b, and/or over another wireless communication interface 112 through a wireless local area network (WLAN) router 114. The wireless terminals 102, 104 include a display device 120, a user interface 122, a camera device 124, a controller 126, and a communication module 128.

The camera device 124 is configured to generate a video data stream based on incident light. The user interface 122 can include a keypad, keyboard, touchpad and/or other user input device. The user 122 interface can also include a microphone that is configured to generate an audio data stream responsive to incident sound, and a speaker that generates sound responsive to an input audio data stream. The communication module 128 is configured to communicate data over one or more of the wireless interfaces 106, 108, and/or 112 to another remote wireless terminal 102,104.

The communication module 128 can include a cellular communication module, a Bluetooth module, and/or a WLAN module. With a cellular communication module, the wireless terminals 102, 104 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b are connected to a Mobile Telephone Switching Office (MTSO) 130 wireless network, which, in turn, is connected to a PSTN 132 and/or another network. With a Bluetooth module, the wireless terminal 102,104 can communicate via an ad-hoc network through the direct interface 106. With a WLAN module, the wireless terminal 102,104 can communicate through the WLAN router 114 using a communication protocol that may include, but is not limited to, 802.11a, 802.11b, 802.11e, 802.11g, 802.11i.

The wireless terminals 102,104 are configured to transmit and/or receive a video data stream with one another and/or with another communication terminal that may be communicatively coupled thereto through, for example the MTSO 130 and the PSTN 132 and/or another network. In some embodiments, the wireless terminals 102, 104 are configured to establish a video telephony connection with one another in which they transmit the video data stream from their respective cameras 124 and receive and display on their respective display devices 120 the received video data stream. The wireless terminals 102, 104 may also exchange an audio data stream that is generated by a microphone and played through a speaker in their respectively user interfaces 122. Accordingly, when a video telephony connection is established through the wireless terminals 102, 104, users may both see and hear one another.

In accordance with various embodiments of the present invention, a wireless terminals that is receiving a video data stream from another wireless terminal informs that other wireless terminal whether or not that video data stream is being displayed, and, if displayed, it informs the other wireless terminal of one or more characteristics associated with how the video data stream is displayed. The display characteristics can include an indication of what video resolution (e.g., lines of video per frame, number of pixels, and/or size indication) and/or what video frame rate is used to display the video data stream on the receiving wireless terminal. The display characteristics can be communicated from the displaying wireless terminal to the transmitting wireless terminal through a display characteristic command. These display characteristics may vary over time responsive to, for example, a user command through the user interface 122. Accordingly, as the display characteristics change over time at the receiving wireless terminal, it can communicate the updated display characteristics to the transmitting wireless terminal.

The transmitting wireless terminal can then selectively transmit or not transmit the video data stream, and can vary one or more characteristics of the transmitted video data stream based on the received display characteristic command. As will be discussed further below, the transmitting wireless terminal may vary the video resolution, video frame rate, compression rate, and/or quality of video that is transmitted to the receiving wireless terminal based on the indication through the display characteristic command of whether and/or how the video data stream will be, or is being, displayed. Accordingly, the receiving wireless terminal can coordinate with the transmitting wireless terminal to optimize the amount of data that is used in the video data stream based on whether and/or how it is to be displayed, and they may thereby increase the efficiency with which they use the data bandwidth of the wireless interfaces 106, 108, and/or 112.

An exemplary embodiment will now be described with reference to the block diagram and associated methods illustrated in FIGS. 2a-c, and by which the wireless terminals 102, 104 establish a video telephony connection therebetween through which users can exchange real time/near real time video and voice. The wireless terminals 102, 104 may initiate the video telephony connection by exchanging display characteristic commands that are indicative of how a received video data stream will be displayed. The wireless terminals 102, 104 respond to the display characteristic command from other terminal by adjusting the video resolution (i.e., display size), compression rate, and/or quality of video that it transmits.

Figure 2A:
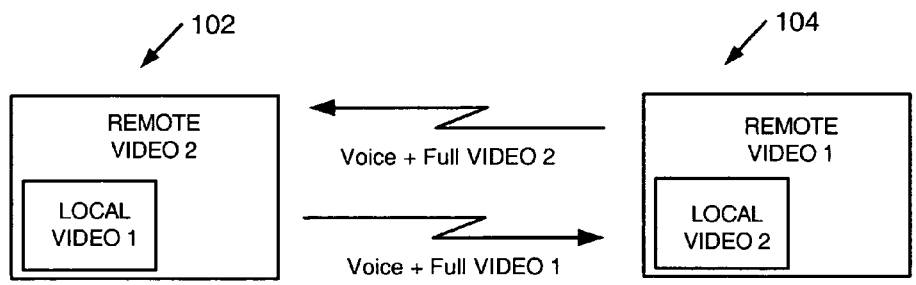
FIGS. 2a-c illustrate different video telephony displays on two wireless communication terminals and the associated data communicated therebetween in accordance with some embodiments of the present invention.
Figure 2B:
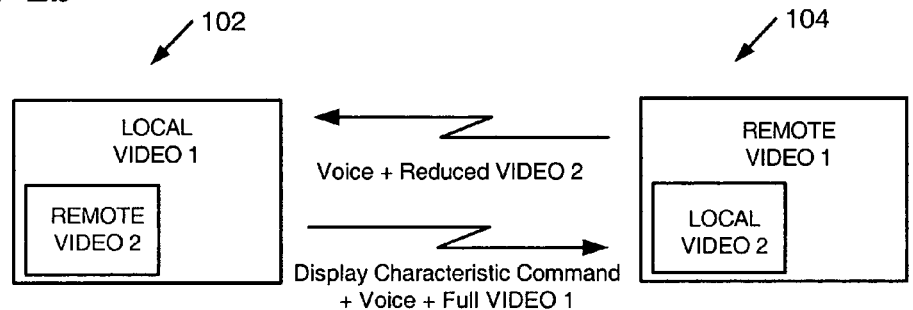

Referring now to FIG. 2a, the wireless terminals 102, 104 initially exchange voice data streams and full video. As shown, wireless terminal 102 displays a large image of the video data stream received from wireless terminal 104 (VIDEO 2) and a small image of the video data stream that is locally generated by the camera 124 (VIDEO 1). For example, the local VIDEO 1 may be displayed in an area of the display device 120 that overlies the VIDEO 2 display area (e.g., a picture-in-picture display format). Similarly, wireless terminal 104 displays a large image of the video data stream received from wireless terminal 102 (VIDEO 1) and a small image of the video data stream that is locally generated by the camera 124 (VIDEO 2).

Referring to FIG. 2 b, a user commands the wireless terminal 102 to swap where the local VIDEO 1 and remote VIDEO 2 data streams are displayed. By swapping the where VIDEO 1 and VIDEO 2 are displayed, the user can obtain an enlarged view of VIDEO 1 which may provide a better appreciation of how it may appear to another user at wireless terminal 104. Accordingly, the local VIDEO 1 is then displayed in the larger area of the display 120 and the remote VIDEO 2 is displayed in the smaller area of the display 120. The wireless terminal 102 also notifies the wireless terminal 104 through the display characteristic command that the VIDEO 2 which it transmits will be displayed in a smaller area. The wireless terminal 104 responds to the change in display characteristics by modifying the VIDEO 2 data stream. The characteristics of the VIDEO 2 data stream that can be modified by the controller 126 in wireless terminal 104 can include, but are not limited to, video resolution, video frame rate, compression rate, and/or other video quality.

The controller 126 in wireless terminal 104 can vary the resolution of the transmitted VIDEO 2 data stream responsive to the display characteristic command. Consequently, the controller 126 in wireless terminal 104 can increase the resolution of the transmitted VIDEO 2 when the display characteristic command indicates that VIDEO 2 will be displayed on a larger area of the display 120 in wireless terminal 102, and can decrease the resolution when VIDEO 2 will be displayed on a smaller area at wireless terminal 102.

The controller 126 in wireless terminal 104 may decrease the frame rate of the transmitted VIDEO 2 data stream when the display characteristic command indicates that VIDEO 2 will be displayed on a larger area of the display 120 in wireless terminal 102, and can decrease the video frame rate when VIDEO 2 will be displayed on a smaller area at wireless terminal 102.

The controller 126 in wireless terminal 104 may use a lossy data compression algorithm that provides a variable quality of video (e.g., vary the amount of information in the video) responsive to the display characteristic command. For example, the video data stream from the camera 124 in wireless terminal 104 can be use a lower compression rate with a corresponding higher video quality when the display characteristic command indicates that VIDEO 2 will be displayed on a larger area of the display 120 in wireless terminal 102, and can use a higher compression rate with a corresponding lower video quality when VIDEO 2 will be displayed on a smaller area at wireless terminal 102. The lossy data compression algorithm can include, but is not limited to, MPEP (moving pictures experts group) and JPEG (joint photographic experts group) data compression algorithms.

Figure 2C:
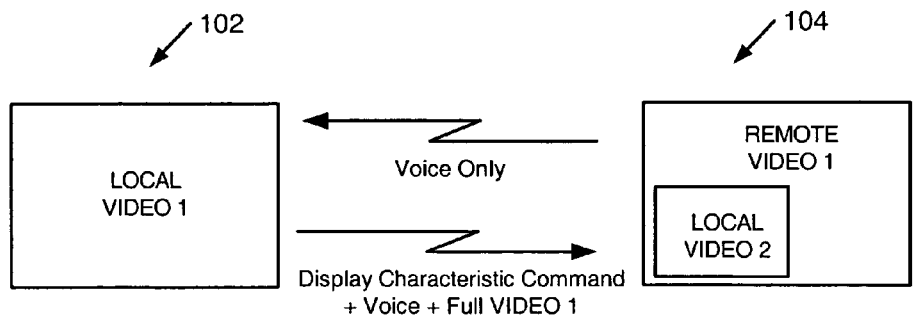

Referring to FIG. 2c, a user commands the wireless terminal 102 to stop displaying VIDEO 2 and only display VIDEO 1. The user may thereby obtain an unobstructed and/or larger view of the VIDEO 1 that is being transmitted to the remote wireless terminal 104. The controller 126 in wireless terminal 102 notifies the wireless terminal 104 through the display characteristic command that the VIDEO 2 is not being displayed at wireless terminal 102. The controller 126 in wireless terminal 104 responds to the notice by stopping its transmission of the VIDEO 2 data stream, while continuing to transmit the voice data stream. If the user subsequently commands the wireless terminal 102 to display VIDEO 2, the controller 126 notifies the wireless terminal 104 through the display characteristic command that the VIDEO 2 will be displayed at wireless terminal 102, and the controller 126 in wireless terminal 104 can respond to the notice by resuming its transmission of VIDEO 2.

Accordingly, the wireless terminals 102, 104 may setup the video telephony connection by coordinating with each other to optimize the amount of data that is used in the transmitted video data stream based whether and/or how it is to be displayed. Then, as one or both the wireless terminals 102, 104 changes how it displays received video, an indication of that change can be coordinated with the other wireless terminal 102, 104 to again optimize the amount of data that is used in the transmitted video data stream.

Figure 3:
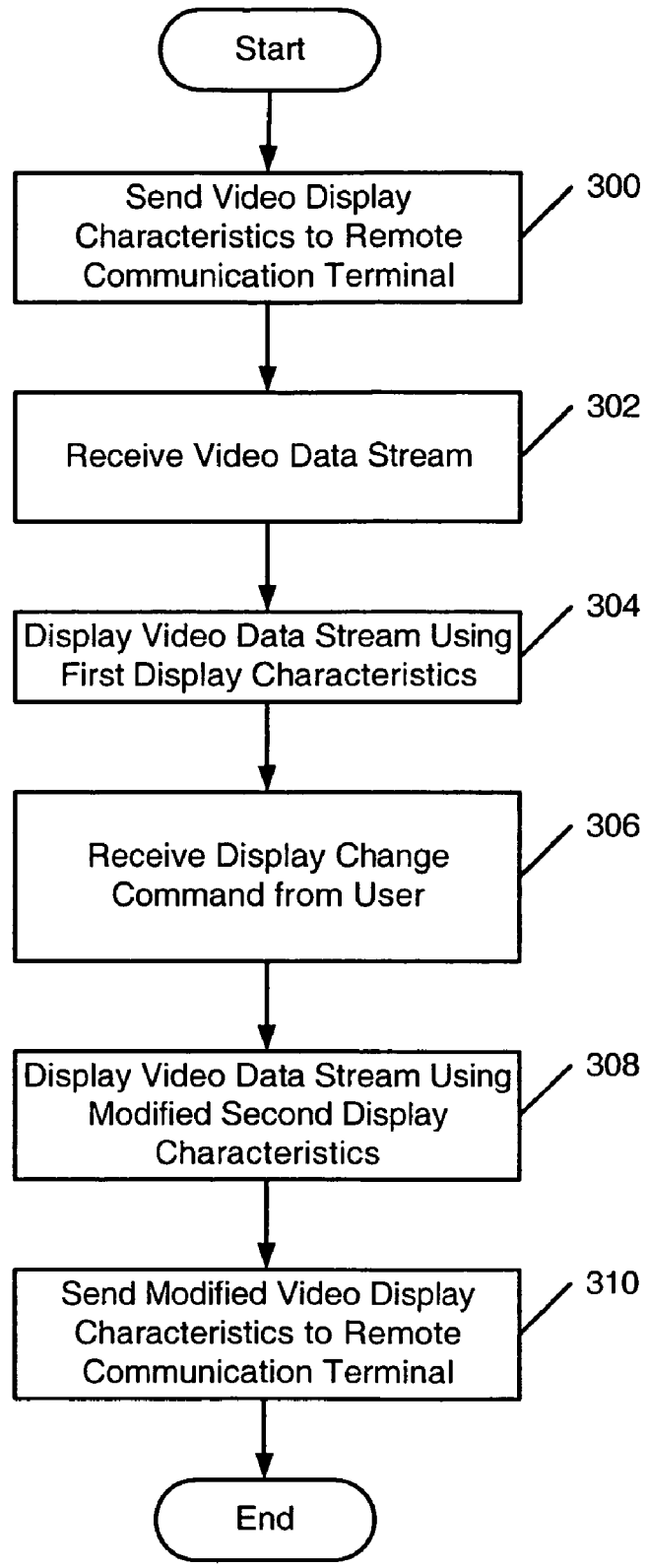
FIG. 3 is a flowchart illustrating operations for varying characteristics of a video data stream from a remote wireless communication terminal using a display characteristic command, in accordance with some embodiments of the present invention.

FIG. 3 is a flowchart that illustrates operations for varying the characteristics of a video data stream that is received from a remote transmitting communication terminal using a display characteristic command. At Block 300, a communication terminal that is to receive video sends a display characteristics command to the remote transmitting communication terminal which characterize how a received video data stream will be displayed on the receiving terminal. At Block 302, the receiving terminal receives the video data stream from the transmitting terminal. At Block 304, the receiving terminal receives a command from a user to change how the received video data stream is displayed thereon. At Block 306, the receiving terminal modifies how it displays the received video data stream. At Block 308, the receiving terminal sends a display characteristics command that notifies the transmitting terminal of the modified characteristics with which the video data stream will be displayed by the receiving terminal.

Figure 4:
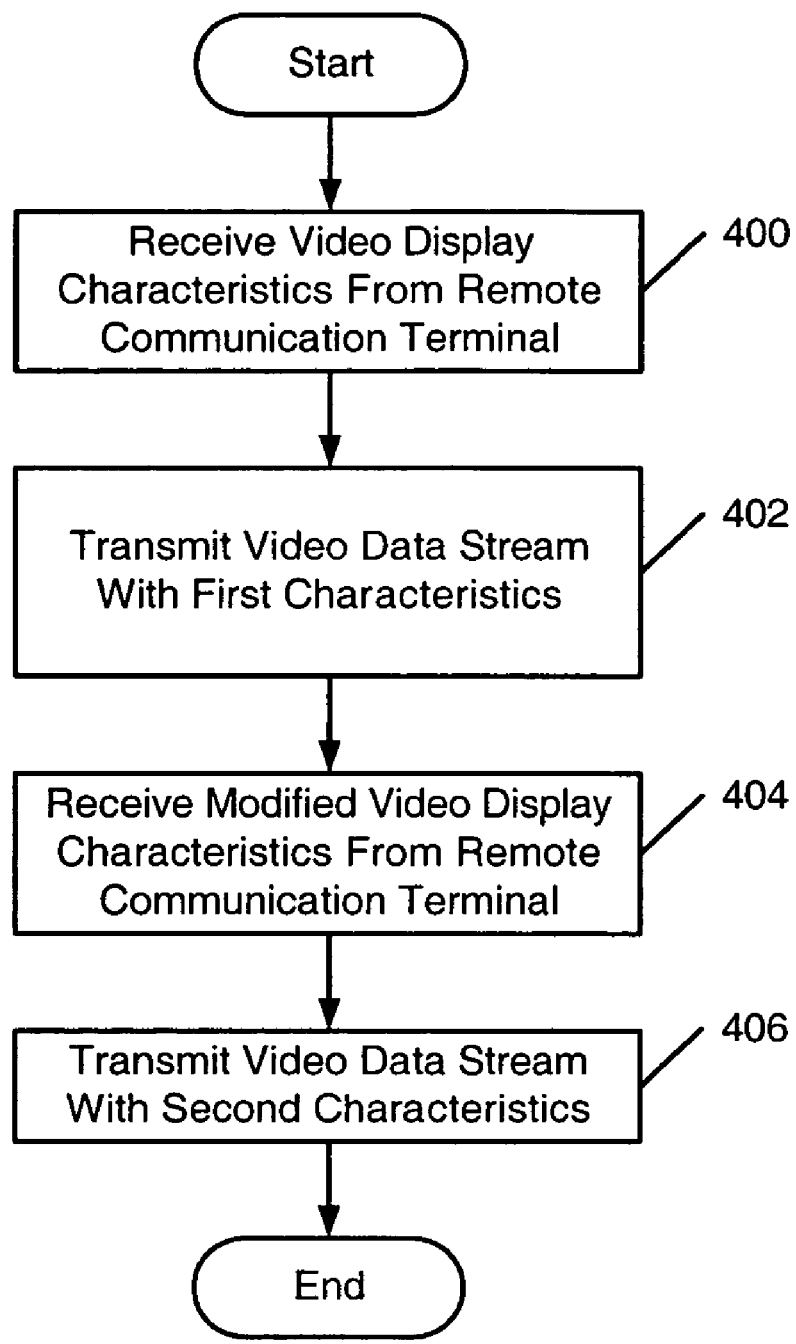
FIG. 4 is a flowchart illustrating operations for varying characteristics of a video data stream that is transmitted to a remote wireless communication terminal responsive to a display characteristic command that is received therefrom, in accordance with some embodiments of the present invention.

FIG. 4 is a flowchart that illustrates operations for varying the characteristics of a video data stream that a transmitting terminal transmits to a remote receiving terminal. At Block 402, the transmitting terminal receives from the remote receiving terminal a display characteristics command which characterize how a received video data stream will be displayed on the remote receiving terminal. At Block 404, the transmitting terminal transmits a video data stream with first characteristics to the receiving terminal. As explained above, the first characteristics of the video data stream can include, video resolution, video frame rate, compression rate, and/or video quality. At Block 406, the transmitting terminal receives a display characteristics command that indicates a modification to how the transmitted video data stream will displayed by the receiving terminal. At Block 408, the transmitting terminal transmits the video data stream with second characteristics that are different than the first characteristics. As was also explained above, the transmitting terminal can vary, for example, the video resolution, video frame rate, compression rate, and/or video quality of the transmitted video data stream.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A communication terminal comprising:
a communication module that is configured to receive a display characteristic command and an input video data stream from a remotely located other communication terminal and to send an output video data stream thereto;
a camera device that is configured to generate an initial video data stream based on incident light;
a display device that is configured to display a received input video data stream from the remote communication terminal; and
a controller that is configured to compress the initial video data stream to generate the output video data stream using a lossy data compression algorithm that provides a variable quality of video, and wherein the controller varies a lossy compression rate and the resulting quality of video responsive to the indication by the received display characteristic command of a resolution at which the output video data stream will be displayed on the remote communication terminal.

2. A communication terminal comprising:
a communication module that is configured to send an output video data stream and an output audio data stream to a remotely located other communication terminal, and to receive a display characteristic command and an input video data stream and an input audio data stream from the remote communication terminal;
a camera device that is configured to generate an initial video data stream based on incident light;
a display device that is configured to display the input video data stream from the remote communication terminal;
a speaker device that is configured to play the input audio data stream from the remote communication terminal; and
a controller that is configured to generate the output video data stream based on the initial video data stream and the received display characteristic command, wherein the received display characteristic command is indicative of whether the output video data stream will be displayed on the remote communication terminal, and the controller is further configured to cease sending the output video data stream while continuing to send the output audio data stream in response to the received display characteristic command indicating that the output video data stream is not being displayed on the remote communication terminal, and is configured to resume sending the output video data stream while continuing to send the output audio data stream in response to the received display characteristic command indicating that the output video data stream is being displayed on the remote communication terminal.

3. The communication terminal of claim 2, wherein:
the received display characteristic command is further indicative of a resolution at which the output video data stream will be displayed on the remote communication terminal; and
the controller is further configured to vary a resolution at which the output video data stream represents the initial video data stream responsive to the indication by the received display characteristic command of the resolution at which the output video data stream will be displayed on the remote communication terminal.

4. The communication terminal of claim 3, wherein the controller is further configured to compress the initial video data stream to generate the output video data stream using a compression rate that varies responsive to the indication by the received display characteristic command of the resolution at which the output video data stream will be displayed on the remote communication terminal.

5. The communication terminal of claim 3, wherein the controller is further configured to vary a frame rate of the output video data stream responsive to the indication by the received display characteristic command of the resolution at which the output video data stream will be displayed on the remote communication terminal.

6. The communication terminal of claim 2, wherein:
the received display characteristic command is further indicative of a frame rate at which the output video data stream will be displayed on the remote communication terminal; and
the controller is further configured to vary a frame rate of the output video data stream responsive to the indication by the received display characteristic command of the frame rate at which the output video data stream will be displayed on the remote communication terminal.

7. The communication terminal of claim 2, wherein:
the received display characteristic command is further indicative of a resolution at which the output video data stream will be displayed on the remote communication terminal; and
the controller is further configured to vary a resolution of the output video data stream relative to the initial video data stream responsive to the indication by the received display characteristic command of the frame rate at which the output video data stream will be displayed on the remote communication terminal.

8. The communication terminal of claim 2, wherein the communication module comprises a wireless communication module that is configured to receive the display characteristic command and the input video data stream over a wireless communication interface from the remote communication terminal and to transmit the output video data stream thereto over the wireless communication interface.

9. The communication terminal of claim 8, wherein the controller is configured to vary a maximum amount of data bandwidth of the wireless communication interface that is to transmit the output video data stream to the remote communication terminal responsive to the received display characteristic command.

10. The communication terminal of claim 8, wherein:
the received display characteristic command is further indicative of a resolution at which the output video data stream will be displayed on the remote communication terminal; and
the controller is further configured to vary a resolution of the output video data stream based on the initial video data stream responsive to the indication by the received display characteristic command of the resolution at which the output video data stream will be displayed on the remote communication terminal.

11. The communication terminal of claim 8, wherein
the received display characteristic command is further indicative of a frame rate at which the output video data stream will be displayed on the remote communication terminal; and
the controller is further configured to vary a frame rate of the output video data stream responsive to the indication by the received display characteristic command of the frame rate at which the output video data stream will be displayed on the remote communication terminal.

12. The communication terminal of claim 2, further comprising:

a microphone that is configured to generate the output audio data stream responsive to incident sound.

13. A communication terminal comprising:

a communication module that is configured to receive an input video data stream from a remotely located other communication terminal and to send a display characteristic command and an output video data stream thereto;

a camera device that is configured to generate the output video data stream based on incident light;

a display device that is configured to display the input video data stream from the remote communication terminal according to a variable video resolution and/or a variable video frame rate;

a controller that is configured to control the display device to display the input video data stream with a particular one of the variable video resolutions and/or a particular one of the variable video frame rates, and to generate the display characteristic command so that it is indicative to the remote communication terminal of the particular video resolution and/or the particular video frame rate at which the input video data stream is displayed on the display; and a user interface through which a user can generate a command to dynamically change a size of a portion of the display device that is used to display the input video data stream while the input video data stream is being displayed on the display device, and wherein the controller is further configured to dynamically vary the particular video resolution and/or the particular video frame rate at which the display device displays the input video data stream responsive to commands received from the user via the user interface, and to further respond to the change command by generating and sending an updated display characteristic command to indicate to the remote communication terminal the present video resolution and/or the present video frame rate at which the input video data stream is presently being displayed on the display.

14. The communication terminal of claim 13, wherein the controller is further configured to command the remote communication terminal through the display characteristic command to compress the video data stream sent to the remote communication terminal using a compression rate that varies responsive to the indication by the display characteristic command of the particular video resolution and/or the particular video frame rate at which the input video data stream is displayed on the display.

15. The communication terminal of claim 13, wherein the controller is further configured to command the remote communication terminal through the display characteristic command to compress the video data stream sent to the remote communication terminal using a lossy data compression algorithm that provides a variable quality of video which is varied responsive to the indication by the display characteristic command of the particular video resolution and/or the particular video frame rate at which the input video data stream is displayed on the display.

16. The communication terminal of claim 13, wherein the controller is further configured to command the remote communication terminal through the display characteristic command to vary a video frame rate of the video data stream that is sent to the remote communication terminal as the input video data stream responsive to the indication by the display characteristic command of the particular resolution and/or the particular video frame rate at which the input video data stream is displayed on the display.

* * * * *